J. J. WILLIS.
Apparatus for Rendering and Refining Animal Fats.
No. 153,874. Patented Aug. 4, 1874.
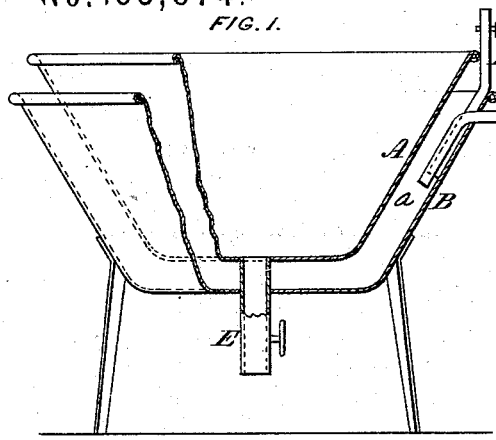
FIG. I.
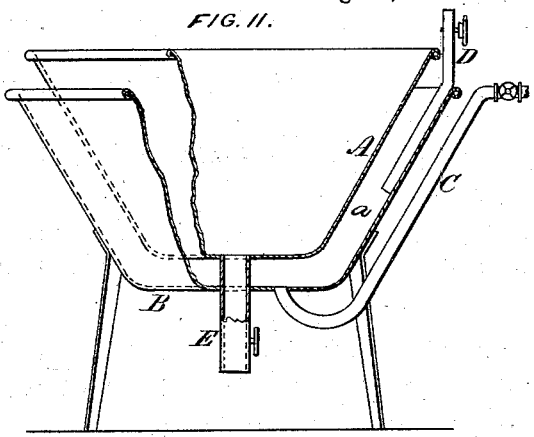
FIG. II.
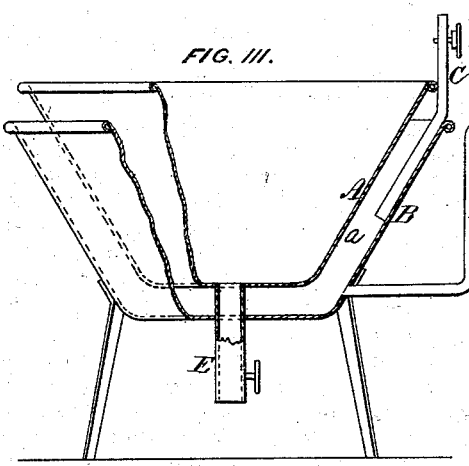
FIG. III.
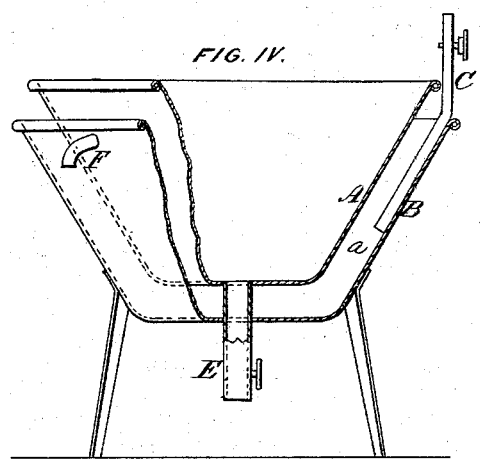
FIG. IV.
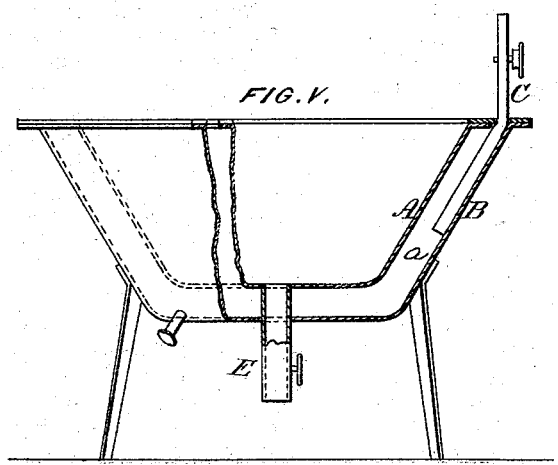
FIG. V.

UNITED STATES PATENT OFFICE.

JOHN J. WILLIS, OF NEW YORK, N. Y.

IMPROVEMENT IN APPARATUS FOR RENDERING AND REFINING ANIMAL FATS.

Specification forming part of Letters Patent No. 153,874, dated August 4, 1874; application filed March 18, 1874.

*To all whom it may concern:*

Be it known that I, JOHN J. WILLIS, of New York city, in the county of New York and State of New York, have invented certain new and useful Improvements in Rendering and Refining Animal Fats, of which the following is a specification:

This invention relates to an apparatus or kettle for rendering and refining animal fats and animal or vegetable oils, whereby all fibrous or foreign matter is extracted from the fat in a thorough and simple manner. The invention consists in comminuting or reducing the animal matter from which the oil or grease is to be extracted to a pulpy state, and then subjecting said matter to the action of heat applied through the medium of steam or waterjacketed kettles or vessels for extracting the fat or grease from the greater portion of the solid or fibrous matter, the extracted fat being then subjected to the ordinary straining process to remove as much of the scrap or tissue as is possible. The grease thus obtained being then refined or purified by reheating or melting the same at a high temperature, so as to cause all fibrous matter to accumulate as a scum or recrement on the surface of the fat and sides of the kettle, thus enabling the fat to be drawn off in a pure and perfectly rendered state.

In the drawings, Figure 1 represents a steam-heated kettle used in my process of rendering and refining fat and oils. Fig. 2 is a similar view illustrating a steam-pipe entering the bottom of the surrounding shell or jacket. Fig. 3 illustrates the same invention with a steam-pipe entering the side of the surrounding shell or jacket. Fig. 4 illustrates the same invention with a steam-pipe extending down between the kettle or vessel and the surrounding shell or jacket. Fig. 5 illustrates a water-heated kettle for the same purpose.

In carrying out my invention, I first reduce the fatty matters from which the grease is to be extracted to a fragmentary or pulpy state by any suitable means, so as to facilitate the separation of the membrane and tissue from the oil or grease. The matters thus reduced are then subjected to the action of heat in kettles or vessels specially constructed for this purpose, in order to melt the fat or grease and permit it to be drawn off with the scrap or tissue in a liquid state.

Figs. 1, 2, 3, and 4 illustrate jacketed kettles, whose interspaces $a$ are open at the top. The jacket B does not extend up as high as the edge of the kettle, so that the water cannot flow from the interspace into the kettle, and a waste-pipe, E, is provided near the top of the jacket to allow the surplus water to run off. A steam-pipe, D, extends down into the interspace G, so as to heat the water by discharging steam directly into it, the steam-pipe terminating at the lower part of the interspace, so as to act on the water directly under the kettle. In lieu of the steam-pipe extending down into the interspace I sometimes employ a steam-pipe, C, which is made to enter the side or bottom of the jacket or shell, the effect being, as above stated, to throw the heated water directly under the bottom of the inner kettle, thus forming a current of hot water which diffuses itself evenly over the whole water-space surrounding said inner kettle.

Fig. 5 illustrates a jacketed kettle, composed of a kettle, A, and jacket B, whose interspace $a$ is closed at top. Into this space steam is admitted by either a pipe, C or D, as may be preferred, so as to heat the contents of the kettle. The contents can be drawn off, as before stated, by a pipe, E, going through the bottom. A suitable pipe is also provided for drawing of the water of condensation from the intermediate space. The kettle is also provided with a discharge-pipe, E, to draw off the fat. The water in the interspace can be heated by the action of fire instead of steam, if preferred.

I use as high a degree of heat as can be obtained by the means above described, so as to melt the fat rapidly, and when it is melted I draw the whole mass off and separate the tallow from the scrap or tissue in any suitable manner—as, for instance, by straining it off in a press or otherwise—and replace the tallow thus obtained in the kettle, the kettle having meanwhile been cleansed, or a fresh kettle substituted, and reheat it, adding thereto a pure and sweet limpid oil. The proportion of oil to be added will vary from about ten to twenty-three per cent. by measure of the tallow. The greater the amount of stearine present in the tallow the greater the quantity of oil required to mix with and reduce it. This mixture is thoroughly heated as hot as possible, and without agitating it or stirring it, and the scum and impurities which rise to the surface are carefully removed. Other impurities will be found adhering to the sides of the kettle. This second heating is continued until no more scum or recrement rises, when the mixture is carefully drawn off through the bottom pipe E without disturbing the impurities that have adhered to the kettle.

No drugs or chemicals are used in this process.

By the above process I am enabled to use all the tallow obtained from the second heating, not separating the stearine, and obtain the desired products at a reduced expense. In cases where the oil or fat to be purified contains an unusual amount of fine impurities, a third or even a fourth repetition of the heating process will be of advantage.

In purifying liquid oils, as much of the coarse impurities as possible should be removed by straining before heating to remove the impurities. I have also found by experience that the ordinary cast-iron kettle is the most suitable for the inner kettle, the surface being left rough as it comes from the foundry, the rough surface causing the impurities to be more firmly retained to the sides.

Having thus described my invention, what I claim as new, and desire to secure by Letters Patent, is—

An open-mouthed kettle, A, placed within a jacket, B, to create an intermediate space, $a$, for receiving steam or water, in combination with a discharge-pipe and a steam-pipe, C or D, communicating with the space $a$ to throw the heated water or steam under the bottom of the kettle, substantially as described, for the purposes specified.

In testimony that I claim the foregoing I have hereunto set my hand this 18th day of March, 1874.

JOHN J. WILLIS.

Witnesses:
 JAMES L. NORRIS,
 A. H. NORRIS.